United States Patent
Na et al.

(10) Patent No.: US 8,406,720 B2
(45) Date of Patent: Mar. 26, 2013

(54) BEAMFORMING WEIGHT GENERATION USING ADAPTIVE TRIGONOMETRIC WAVEFORM INTERPOLATION TECHNIQUES

(75) Inventors: Yanxin Na, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 782 days.

(21) Appl. No.: 12/543,593

(22) Filed: Aug. 19, 2009

(65) Prior Publication Data

US 2011/0045792 A1 Feb. 24, 2011

(51) Int. Cl.
*H04B 1/06* (2006.01)

(52) U.S. Cl. ............ 455/272; 455/276.1; 342/367; 342/368

(58) Field of Classification Search .......... 455/424, 455/425, 456.5, 456.6, 561, 550.1, 575.1, 455/423, 69, 63, 4; 375/267, 260; 370/335; 342/378, 373, 417, 367, 368, 372, 377
See application file for complete search history.

(56) References Cited

U.S. PATENT DOCUMENTS

| | | | | |
|---|---|---|---|---|
| 6,266,528 B1* | 7/2001 | Farzaneh | ................ | 455/423 |
| 6,392,596 B1* | 5/2002 | Lin et al. | ................ | 342/378 |
| 6,694,155 B1* | 2/2004 | Chin et al. | ................ | 455/562.1 |
| 7,359,733 B2* | 4/2008 | Liang et al. | ................ | 455/562.1 |
| 2003/0181165 A1* | 9/2003 | Sugar et al. | ................ | 455/69 |
| 2004/0219892 A1* | 11/2004 | Vaidyanathan et al. | ....... | 455/103 |
| 2004/0266354 A1* | 12/2004 | Hamada et al. | ................ | 455/63.4 |
| 2006/0007043 A1* | 1/2006 | Xin | ................ | 342/417 |
| 2007/0263736 A1* | 11/2007 | Yuda et al. | ................ | 375/260 |
| 2008/0037474 A1* | 2/2008 | Niwano | ................ | 370/335 |
| 2008/0095260 A1* | 4/2008 | Vaidyanathan | ................ | 375/267 |
| 2008/0232497 A1* | 9/2008 | Hart et al. | ................ | 375/260 |
| 2009/0036062 A1* | 2/2009 | Tanaka et al. | ................ | 455/69 |
| 2009/0066577 A1* | 3/2009 | Kim et al. | ................ | 342/373 |
| 2009/0067513 A1* | 3/2009 | Kim et al. | ................ | 375/260 |
| 2009/0322614 A1* | 12/2009 | Na et al. | ................ | 342/377 |
| 2010/0027698 A1* | 2/2010 | Kim et al. | ................ | 375/260 |
| 2010/0104038 A1* | 4/2010 | Stager et al. | ................ | 375/267 |
| 2010/0158151 A1* | 6/2010 | Krauss et al. | ................ | 375/267 |

\* cited by examiner

*Primary Examiner* — Duc Nguyen
*Assistant Examiner* — Charles Chow
(74) *Attorney, Agent, or Firm* — Edell, Shapiro & Finnan, LLC (57) ABSTRACT

Techniques are provided herein to generate beamforming weight vectors for transmissions to be made from a first wireless communication device, e.g., a base station, to a second wireless communication device, e.g., a client device. The first device has a plurality of antennas and receives uplink transmissions from the second device, each uplink transmission comprising a group of frequency subcarriers. The first device computes channel information from the received uplink transmission and computes one or more trigonometric waveforms determined to approximate the channel information. One or more downlink beamforming weight vectors are computed at any given frequency subcarrier (thus in any frequency subband) by interpolation using the one or more trigonometric waveforms.

20 Claims, 7 Drawing Sheets

BEAMFORMING WEIGHT GENERATION USING ADAPTIVE TRIGONOMETRIC WAVEFORM INTERPOLATION TECHNIQUES

TECHNICAL FIELD

The present disclosure relates to wireless communication devices and systems and more particularly to techniques for generating beamforming weight vectors used for beamforming transmission from one device to another device.

BACKGROUND

In a wideband wireless communication system, the channel signatures in different frequency bands may be mutually uncorrelated. That is, the behavior of the wireless channel between two devices in one frequency band is different than that in another frequency band. Consequently, it is difficult to apply beamforming techniques in such a system due to the lack of accurate channel information in some frequency bands. Estimating the channel information in other frequency bands using, for example, feedback techniques, is one solution but it involves adding overhead to the communication link in one direction.

In time division duplex (TDD) systems, the uplink channel coefficients describing the channel in the uplink direction (e.g., from a wireless client device to a base station) are strongly correlated with the downlink channel coefficients describing the channel in the downlink direction (from the base station to the wireless client device). There are ways to exploit this property in order to estimate the channel information in any frequency band for purposes of computing beamforming weights used for beamforming transmissions from one device to another device.

DESCRIPTION OF EXAMPLE EMBODIMENTS

Overview

Techniques are provided herein to generate beamforming weight vectors for transmissions to be made from a first wireless communication device, e.g., a base station, to a second wireless communication device, e.g., a client device. The first device has a plurality of antennas and receives uplink transmission from the second device, each uplink transmission comprising a group of frequency subcarriers. The first device computes channel information from the received uplink transmissions and computes one or more trigonometric waveforms determined to approximate the channel information. One or more downlink beamforming weight vectors are computed at any given frequency subcarrier (thus in any frequency subband) by interpolation using the one or more trigonometric waveforms.

This technique is useful for generating downlink beamforming weights for all bands (i.e., at any given frequency subcarrier in a frequency subband) by interpolation with respect channel information derived for a part (some other frequency subcarrier) of the frequency subband. This scheme does not require any feedback of information about the channel from the second device to the first device, and is particularly useful when there is a frequency mismatch in the channel information between the uplink and downlink associated with two devices.

Example Embodiments

Figure 1:
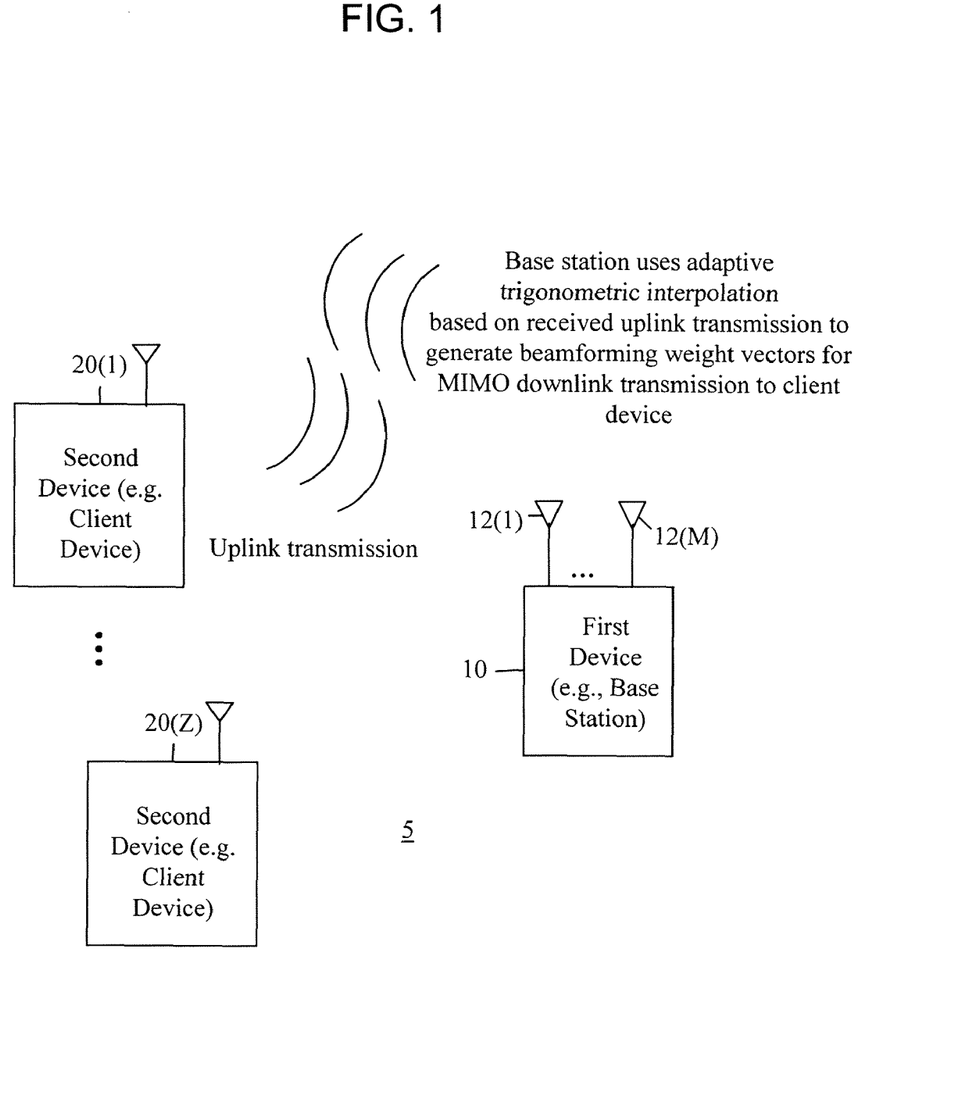
FIG. 1 is diagram illustrating a wireless communication system in which a first device is configured to use adaptive trigonometric interpolation based on transmissions received from a second device to generate beamforming weight vectors for downlink transmissions to the second device.

Referring first to FIG. 1, a wireless communication system is generally shown at reference numeral 5. The system 5 comprises a first wireless communication device 10, e.g., a base station that serves a plurality of second wireless communication devices (e.g., client devices) shown at 20(1)-20(Z).

The base station 10 comprises M plurality of antennas 12(1)-12(M). The client devices 20(1)-20(Z) may comprise one or a plurality of antennas. The base station 10 may serve as a gateway for client devices to another network, i.e., the Internet.

The base station 10 is configured to receive uplink transmissions from a given client device, e.g., client device 20(1), and to use adaptive trigonometric interpolation based on the received uplink transmissions to generate downlink beamforming weight vectors for multiple-input multiple-output (MIMO) downlink transmissions to the client device 20(1). The base station 10 may perform this process with respect to communications with each of the client devices 20(1)-20(Z).

The adaptive trigonometric interpolation beamforming weight vector generation technique described herein allows the base station to compute beamforming weight vectors for all frequencies (frequency subcarriers) of interest by interpolating the estimated channel information computed for part of a frequency subband, i.e., at one or more other frequency subcarriers. These techniques are not sensitive to calibration error nor to changing of antennas in the base station 10 during initial installation or any time thereafter.

In the following description, one or more beamforming weight vectors are generated for downlink transmission in a time division duplex (TDD) orthogonal frequency division multiple access (OFDMA) system as an example. A single beamforming weight vector is used when transmitting a single signal stream from the base station to a client device, whereas multiple beamforming weight vectors are used when transmitting multiple signal streams simultaneously from the base station to the client device. The latter situation is what is known as a multiple-input multiple-output (MIMO) transmission. These techniques are applicable to generate beamforming weight vectors in any system with frequency mismatch in the channel between the uplink and downlink.

Figure 2:
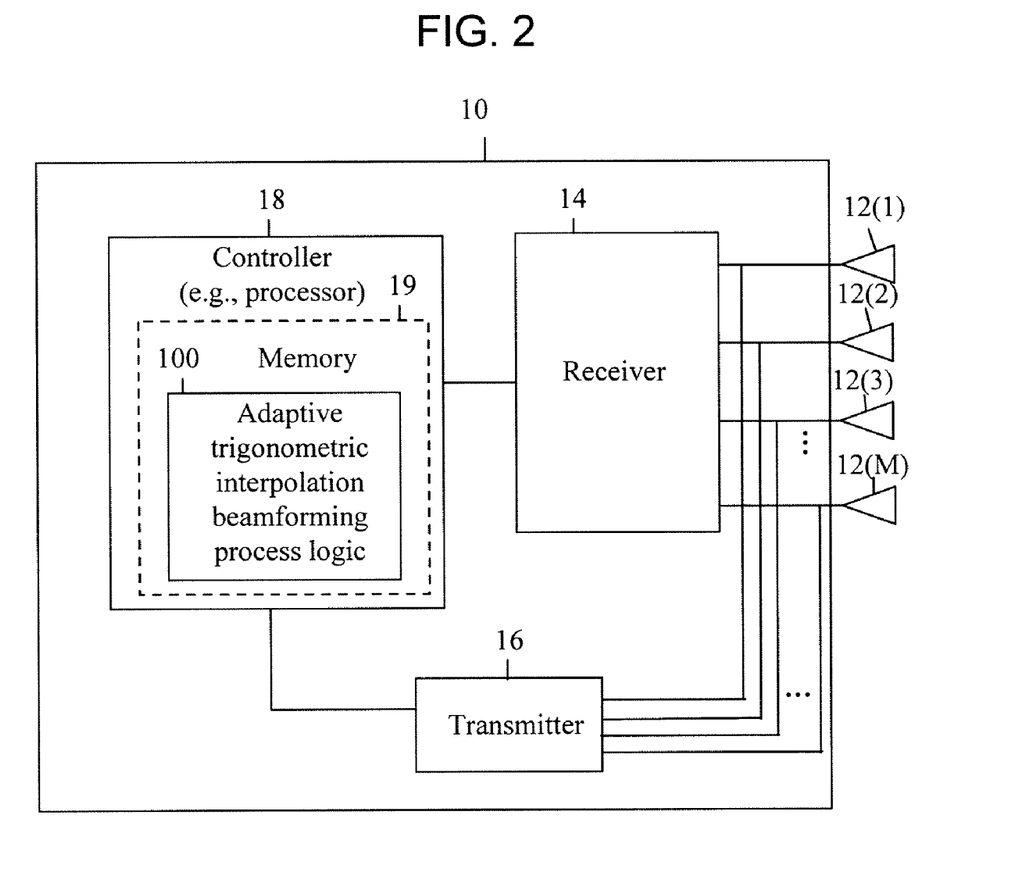
FIG. 2 is a block diagram of the first wireless communication device configured to generate beamforming weight vectors from received uplink transmissions using an adaptive trigonometric interpolation process.

Reference is now made to FIG. 2 for a description of a wireless communication device, e.g., base station 10, that is configured or equipped to perform the aforementioned adaptive trigonometric interpolation beamforming weight vector computation process. The base station 10 comprises a receiver 14, a transmitter 16 and a controller 18. The controller 18 supplies data to the transmitter 16 to be transmitted and processes signals received by the receiver 14. In addition, the controller 18 performs other transmit and receive control functionality. Parts of the functions of the receiver 14, transmitter 16 and controller 18 may be implemented in a modem and other parts of the receiver 14 and transmitter 16 may be implemented in radio transmitter and radio transceiver circuits. It should be understood that there are analog-to-digital converters (ADCs) and digital-to-analog converters (DACs) in the various signal paths to convert between analog and digital signals. There are also additional computations, such as a Fast Fourier Transforms (FFT), that may be performed in separate hardware components or by functions of the controller 18.

The receiver 14 receives the signals detected by each of the antennas 12(1)-12(M) and supplies corresponding antenna-specific receive signals to the controller 18. It is understood that the receiver 14 may comprise a plurality of individual receiver circuits, each for a corresponding one of a plurality of antennas 12(1)-12(M) and which outputs a receive signal associated with a signal detected by a respective one of the plurality of antennas 12(1)-12(M). For simplicity, these individual receiver circuits are not shown. The transmitter 16 may comprise individual transmitter circuits that supply respective upconverted signals to corresponding ones of a plurality of antennas 12(1)-12(M) for transmission. For simplicity, these individual transmitter circuits are not shown.

The controller 18 is, for example, a signal or data processor that comprises a memory 19 or other data storage block that stores data used for the techniques described herein. The memory 19 may be separate or part of the controller 18. Instructions associated with receive adaptive trigonometric interpolation beamforming process logic 100 may be stored in the memory 19 for execution by the controller 18.

The functions of the controller 18 may be implemented by logic encoded in one or more tangible media (e.g., embedded logic such as an application specific integrated circuit, digital signal processor instructions, software that is executed by a processor, etc.), wherein the memory 19 stores data used for the computations described herein and stores software or processor instructions that are executed to carry out the computations described herein. Thus, the process 100 may be implemented with fixed logic or programmable logic. In one form, software/computer instructions are stored in the memory 19 that when executed by a processor, cause the processor to perform the functions described herein associated with process logic 100. To this end, the controller 18 may be a programmable processor such as a microprocessor or microcontroller. In another form, the controller 18 is in the form of programmable digital logic (e.g., field programmable gate array) or an application specific integrated circuit (ASIC) that comprises fixed digital logic, or a combination thereof. For example, the controller 18 may be a modem in the base station 10 and thus be embodied by digital logic gates in a fixed or programmable digital logic integrated circuit, which digital logic gates are configured to perform the process logic 100.

This techniques described herein are applicable to beamforming weight generation in any MIMO or multiple-input single output (MISO) wireless communication system with frequency mismatch between uplink and downlink transmissions, such as in TDD OFDMA, TDD code division multiple access (CDMA), time division multiple access (TDMA) and TDD OFDMA wireless communication systems. The following description is made with respect to a MIMO TDD OFDMA system, such as an IEEE 802.16 or WiMAX™ system, as an example only. The adaptive trigonometric interpolation beamforming generation techniques are useful in a base station (having M antennas) when there is frequency mismatch between downlink and uplink transmission for a given client device having one or more antennas.

In the foregoing description, traffic between a first device, e.g., base station 10, and a second device, e.g., client device 20(1), is traffic in the partial use of subcarrier (PUSC) mode in the IEEE 802.16e communication standard, as an example. Based on the received signals in the uplink PUSC subchannels, the base station 10 estimates one or more beamforming weight vectors at other frequency subcarriers used in for downlink transmissions to the client device.

Turning now to FIGS. 3-7, the process logic 100 is described in more detail.

Figure 3:
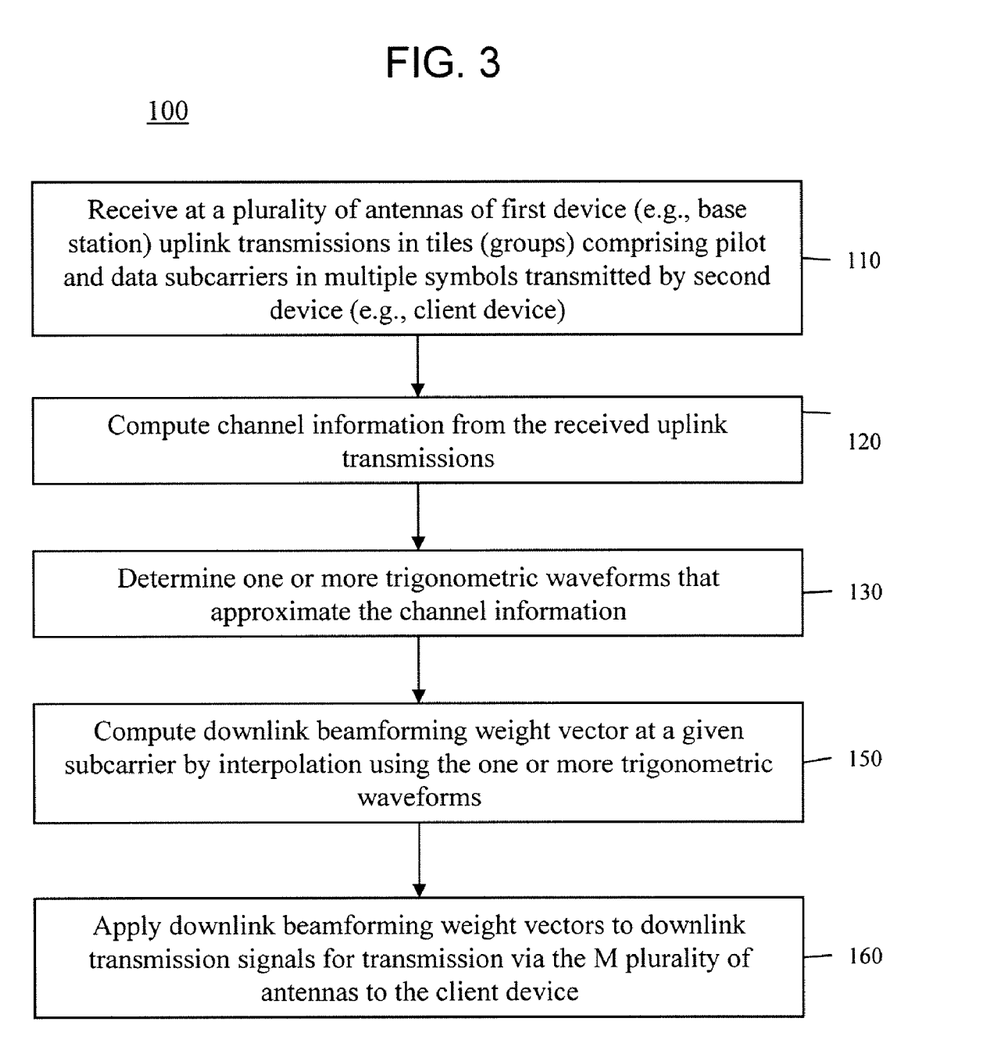
FIG. 3 is a flow chart generally illustrating the adaptive trigonometric interpolation process.

First, the process logic 100 is described generally with respect to FIG. 3. At 110, the first device, e.g., base station 10, receives at its M plurality of antennas uplink transmissions sent from the second device, e.g., client device 20(1). The uplink transmissions comprise groups of frequency subcarriers, such as so-called tiles in accordance with the IEEE 802.16e PUSC mode. Each tile comprises pilot subcarriers (containing pilot signals used for channel estimation) and data subcarriers (used for carrying traffic) in each of multiple symbols.

At 120, the first device computes channel information from the received uplink transmissions. The function 120 is described in more detail hereinafter in connection with the flow chart of FIG. 4 and the diagram of FIG. 5.

At 130, the first device determines one or more trigonometric waveforms that approximate (to represent) the channel information computed at 120. As described in more detail hereinafter in connection with the flow chart of FIG. 6, the trigonometric waveforms are, for example, sine and cosine waveforms.

At 150, one or more downlink beamforming weight vectors are computed at any given subcarrier by interpolation using the one or more trigonometric waveforms. The function 150 is described in more detail hereinafter in connection with the flow chart of FIG. 7 and is performed at each of plurality of subcarriers of interest allocated for a downlink transmission when beamforming a downlink transmission from the first device to the second device. When a single signal is to be beamformed via the plurality of antennas of the first device to the second device, then only a single downlink beamforming weight vector (at each of the plurality of frequency subcarriers of interest) is needed. In general, the number of beamforming weight vectors needed corresponds to the number of spatial signal streams to be beamformed (simultaneously) from the first device to the second device.

At 160, the downlink beamforming weight vector(s) computed at 150 are applied to one or more signal streams to be transmitted from the M antennas of the first device to the second device.

Figure 4:
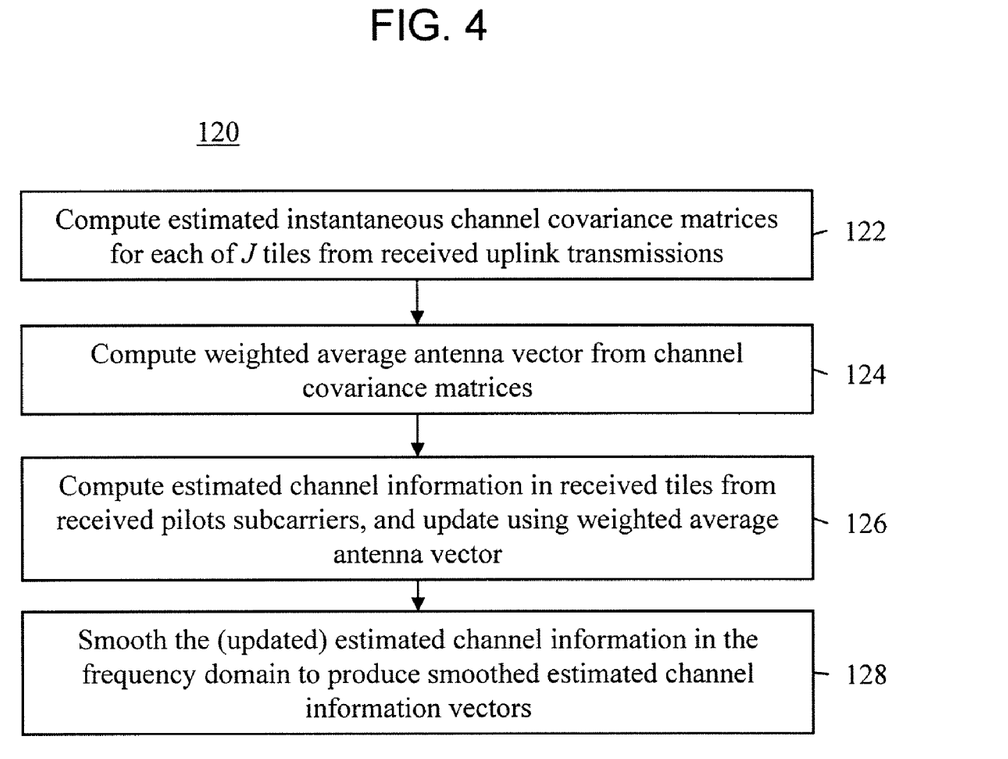
FIG. 4 is a flow chart of channel information estimation functions of the adaptive trigonometric interpolation process.
Figure 5:
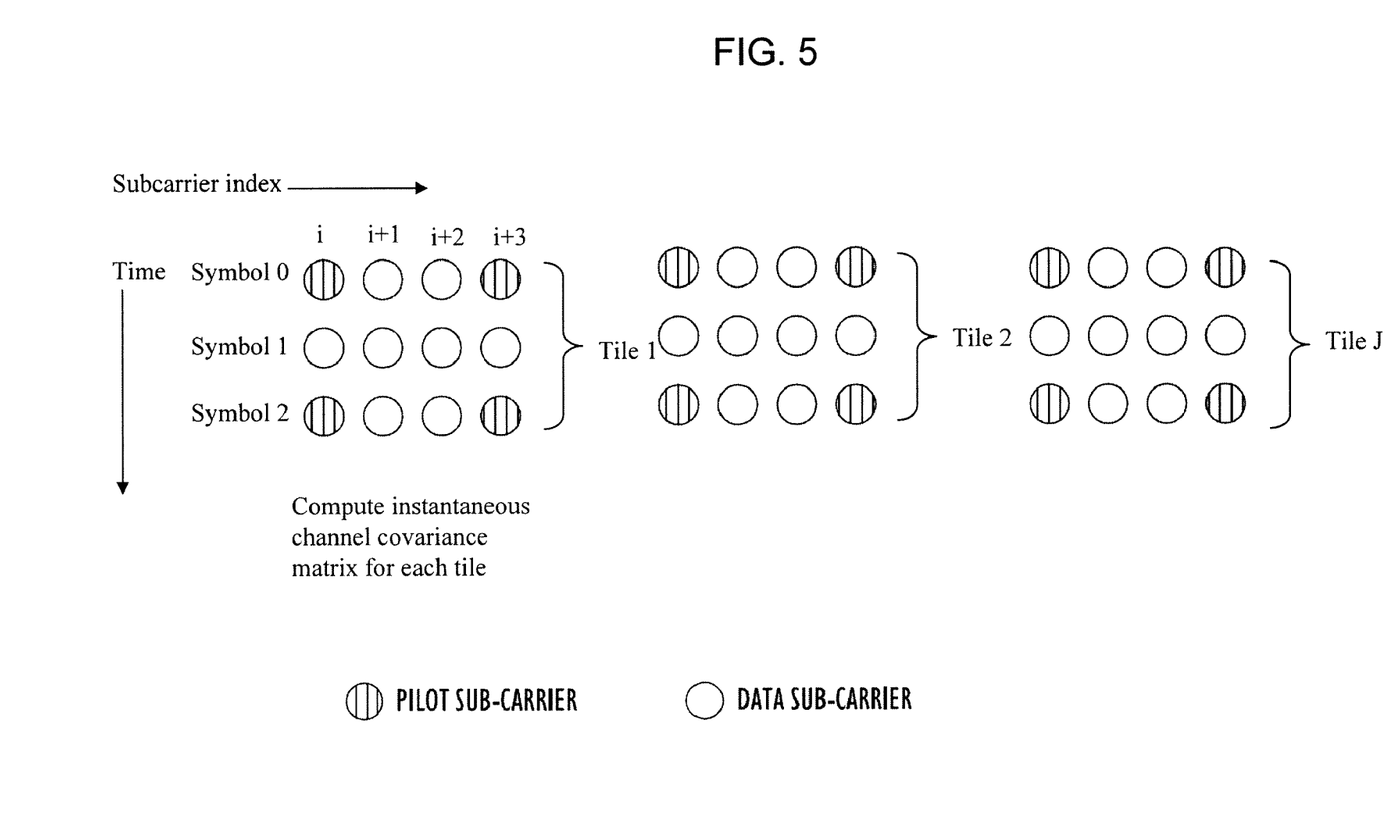
FIG. 5 is a diagram depicting an example of groups of subcarriers in the received uplink transmissions from which the channel information is estimated.

Turning now to FIGS. 4 and 5, the function 120 is described in more detail. In the example described herein, the uplink transmissions are formatted in groups of frequency subcarriers, as shown in FIG. 5. In particular, in the IEEE 802.16e standard, each client device (also referred to herein as a "user"), is assigned uplink PUSC "subchannels". There are 6 PUSC tiles in one uplink PUSC subchannel. In one PUSC tile, there are 12 subcarrier signals comprising 4 pilot subcarriers and 8 data subcarriers. There are four subcarriers in each symbol period number 0, 1 and 2. According to the techniques described herein, all 12 subcarriers in a group, e.g., a tile, are analyzed to estimate an uplink channel covariance matrix for one PUSC tile. Thus, at 122, based on received uplink transmissions, an estimated instantaneous channel covariance matrix is computed for each of J tiles.

The group of J instantaneous channel covariance matrices for a given client device is denoted $\{R_{i_n}\}_{n=1}^{J}$, where J is the number of tiles, $i_1, i_2, \ldots, i_J$ are the index of received subcarriers in the J tiles respectively, where the subcarrier index in the nth received PUSC tile is denoted be $i_n$. The FFT size employed, and thus the maximum number of subcarriers, is N, such that $1 \leq i_1 < i_2 < \ldots < i_J \leq N$. For example, in an uplink PUSC tile, $S_{j,q}(m)$ for $1 \leq m \leq M$ denotes the received frequency domain signals on the jth subcarrier, the qth symbol, and mth antenna, where M is the number of antennas at the first device, e.g., base station. The instantaneous channel covariance matrix $R_{i_n}$ is computed as $$R_{i_n} = \frac{1}{12} \sum_j \sum_q \begin{bmatrix} S_{j,q}(1) \\ S_{j,q}(2) \\ \vdots \\ S_{j,q}(m) \end{bmatrix} \begin{bmatrix} S_{j,q}(1) \\ S_{j,q}(2) \\ \vdots \\ S_{j,q}(m) \end{bmatrix}^H,$$

where $^H$ denotes the Hermitian operation, and there are four subcarriers and three symbols considered, hence the 1/12 considered in above calculation. In general, there would be a "divide by K" factor for K subcarriers in the group (tile) of subcarriers for a given client device.

When receiving several "slots" or transmissions of signals in the same PUSC subchannel for a period of time greater than or equal to the "coherence time" (that minimal period of time during which changes in the channel are uncorrelated), $R_{i_n}$ can be used as the average estimated uplink channel covariance matrix.

At 124, a weighted average antenna vector is computed from the channel covariance matrices. This weighted average antenna vector is analogous to a receive weight vector. Either of two methods may be used to estimate the weighted average antenna vector $W_{i_n}$. The first method is based on the columns of the uplink channel covariance matrices and the second is based on the rows of the uplink channel covariance matrices.

According to the first method, the J estimated uplink channel covariance matrices $\{R_{i_n}\}_{n=1}^{J}$, $R_{i_n} = [r_{i_n,1}\ r_{i_n,2} \ldots r_{i_n,M}]$, are obtained as explained above in connection with function 122, where $r_{i_n,m}$, for $1 \leq m \leq M$, is the mth column vector in $R_{i_n}$. Applying maximum ratio combining, the sum of the columns of the uplink channel covariance matrix $R_{i_n}$ is obtained as $U_{i_n} = r_{i_n,1} + e^{j\Theta_2} r_{i_n,2} + \ldots + e^{j\Theta_M} r_{i_n,M}$, where $e^{j\Theta_m} = \{r_{i_n,m}\}^H r_{i_n,1}/(abs(\{r_{i_n,m}\}^H r_{i_n,1}))$, for $2 \leq m \leq M$, is the phase rotation of the mth column related to the first column. The weighted average antenna vector $W_{i_n}$ is computed as $W_{i_n} = U_{i_n}/M$.

According to the second method, the J estimated uplink channel covariance matrices $$\{R_{i_n}\}_{n=1}^{J}, R_{i_n} = \begin{bmatrix} \tilde{r}_{i_n,1} \\ \tilde{r}_{i_n,2} \\ \vdots \\ \tilde{r}_{i_n,M} \end{bmatrix},$$

are obtained as explained above in connection with function 122, where $\tilde{r}_{i_n,m}$, for $1 \leq m \leq M$, is the mth row vector $R_{i_n}$.

Appling the maximum ratio combining, the sum of the rows of the uplink channel covariance matrix $R_{i_n}$ is obtained as $U_{i_n} = \{\tilde{r}_{i_n,1} + e^{j\Theta_2} \tilde{r}_{i_n,2} + \ldots + e^{j\Phi_M} \tilde{r}_{i_n,M}\}^H$ where $e^{j\Phi_m} = \tilde{r}_{i_n,1} \{\tilde{r}_{i_n,m}\}^H /(abs(\tilde{r}_{i_n,1}\{\tilde{r}_{i_n,m}\}^H))$, for $2 \leq m \leq M$, is the phase rotation of the mth row related to the first row. The weighted average antenna vector $W_{i_n}$ is computed as $W_{i_n} = U_{i_n}/M$.

At 126, estimated channel information for each received tile is computed from received pilot subcarriers and the weighted average antenna vector $W_{i_n}$ is used to update the estimated channel information. Since the transmitted values at pilot subcarriers are values known to the base station, the actual received values can be compared with the known transmit value at the pilot subcarriers and used to compute estimated channel information $\tilde{H}_{i_n}$. Then, updated estimated channel information $\hat{H}_{i_n}$ is computed based on the weighted average antenna vector $$W_{i_n} as \hat{H}_{i_n} = \frac{(W_{i_n}^H \tilde{H}_{i_n})}{|W_{i_n}|^2} W_{i_n}.$$

Next, at 128, the updated estimated channel information $\hat{H}_{i_n}$ for each tile is adjusted, i.e., "smoothed", in the frequency domain to correct for possible timing error offsets. This smoothing operation is computed as follows.

$$P_S = \sum_{m=1}^{M} \left| \sum_{n=1}^{J} \hat{H}_{i_n}(m) e^{j2\pi(T_S-1)(i_n-1)/N} \right|,$$

where $T_S = [\tau_1 \ldots \tau_u \ldots \tau_U] = c1:c2$, where c1:c2 denote a range of time delay values of a sampling interval (e.g., −32:32), N is the FFT size such as 512. A smoothing parameter $\tau_{smooth}$ is computed such that $$\tau_{smooth} = \underset{\tau_u}{\arg\max}(P_S).$$

If $\tau_{smooth} \neq 1$, the "smoothed" estimated channel information vector for each tile is computed as $\hat{H}_{i_n} = \hat{H}_{i_n} e^{j2\pi(\tau_{smooth}-1)(i_n-1)/N}$, for $1 \leq n \leq J$.

Figure 6:
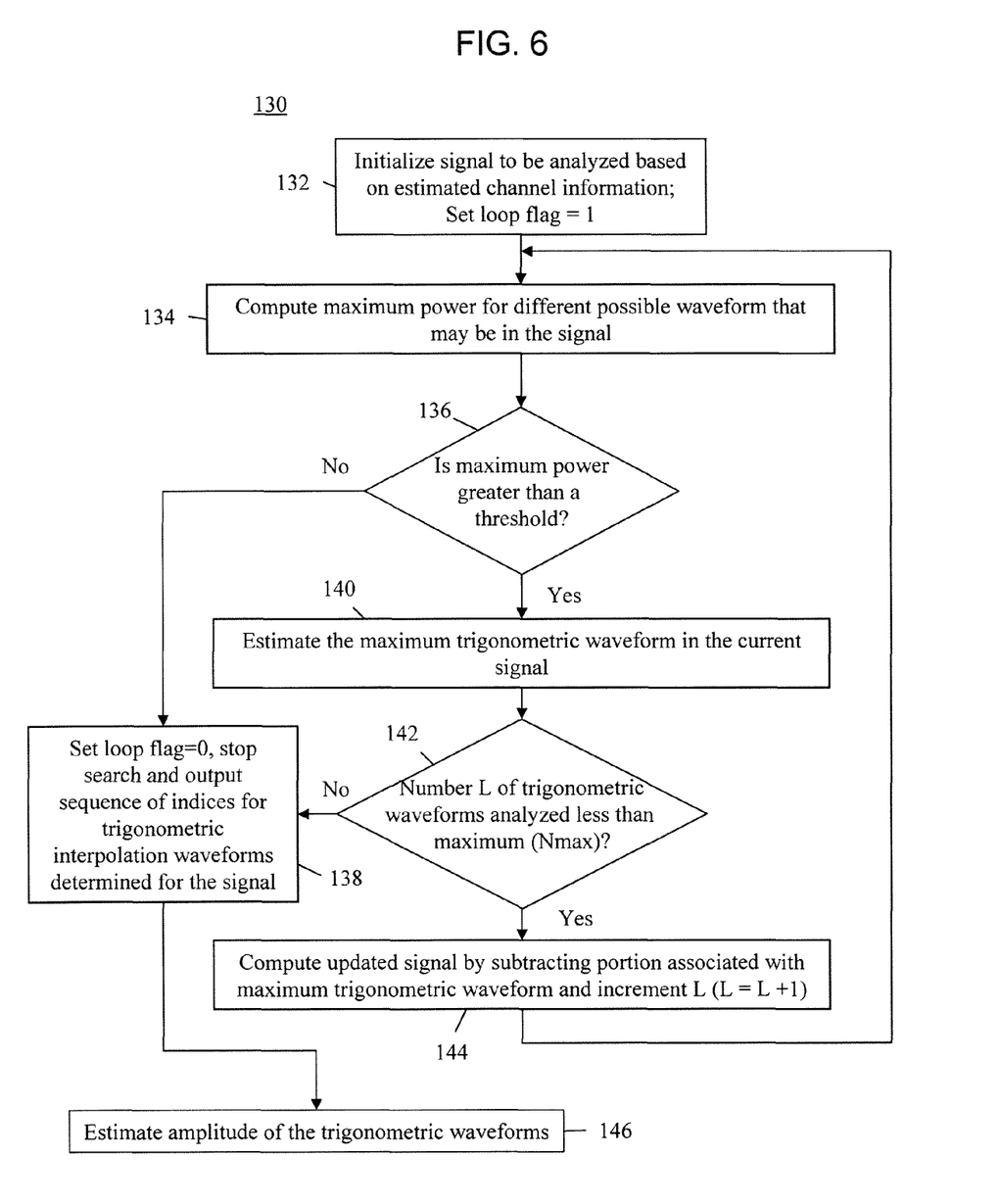
FIG. 6 is a flow chart of trigonometric waveform determination functions of the adaptive trigonometric interpolation process.

Turning now to FIG. 6, the function 130 of determining one or more trigonometric waveforms to approximate the "smoothed" estimated channel information is now described. At 132, a signal to be analyzed is initialized based on the estimated channel information. That is, at 132, the signal $S_{i_n}$ is initialized to $\hat{H}_{i_n}$, a loop flag is initialized, e.g., $F_{flag}=1$, a waveform index L is initialized, i.e., L=1, and a maximum number of waveforms $N_{max}$ is set, i.e., $N_{max}=6$. The trigonometric waveform is a waveform of the form cosine+jsine, or otherwise represented as $e^{j2\pi[\ldots]}$, where the argument $[\ldots]$ is equal to $(T_f-1)(i_n-1)/N$, where $T_f=[\tau_1 \ldots \tau_u \ldots \tau_U]=c3:c4$, where c3:c4 represents a range of time delay values of a sampling interval (e.g., −25:25), and N is the FFT size such 512. Thus, for each time delay value $\tau_u$, there is a different trigonometric waveform.

At 134, the power is computed for each of the values of $T_f$ according to the expression:

$$P_f = \sum_{m=1}^{M} \left| \sum_{n=1}^{J} S_{i_n}(m) e^{j2\pi(T_f-1)(i_n-1)/N} \right|.$$

The value of $\tau_u$ that yields the maximum power $P_f$ is denoted $$\tau_L = \underset{\tau_u}{\operatorname{argmax}}(P_f),$$

is stored and then compared at 135 with a threshold. For example, at 136, $\max(P_f)$ is compared with c * $\operatorname{mean}(P_f)$, where c is a scalar factor, such as 1.5. If this threshold is not exceeded, then, the process goes to 138 where the loop flag is set to 0, the process 130 is stopped, and an output is generated comprising a sequence of indices $[\tau_{L_1} \tau_{L_2} \ldots \tau_{L_u} \ldots \tau_{L_Q}]$ computed up to this point for trigonometric interpolation waveforms, where $\tau_{L_i} \neq \tau_{L_j}$ when i≠j. On the other hand, if at 136 it is determined that this threshold is exceeded, then at 140, then the maximum trigonometric waveform in the current signal (in the loop) is computed as $$h(m) = \frac{1}{J} \sum_{n=1}^{J} S_{i_n}(m) e^{j2\pi(\tau_L-1)(i_n-1)/N},$$

where m is the antenna index $1 \leq m \leq M$.

At 142, it is determined whether the current number of trigonometric waveforms, i.e., waveform index L, is less than $N_{max}$. If so, then the process continues to 144 where an updated signal is computed by subtracting a portion associated with the current maximum trigonometric waveform, that is, $S_{i_n}(m) = S_{i_n}(m) - h(m)e^{-j2\pi(\tau_L-1)(i_n-1)/N}$, for $1 \leq m \leq M$ and $1 \leq n \leq J$. Also at 144 the waveform index L is incremented (L=L+1), Then, the loop repeats from 134. Ultimately, when at 142 it is determined that the number of number of waveforms considered is equal to $N_{max}$, then the loop terminates at 138.

Again, when the loop terminates at 138, a sequence of indices $[\tau_{L_1} \tau_{L_2} \ldots \tau_{L_u} \ldots \tau_{L_Q}]$ for trigonometric waveforms determined for the smoothed estimated channel information is output.

In summary, function 130 adaptively/dynamically determines how many "cosine+jsine" waveforms are needed to accurately represent the smoothed estimated channel information $\hat{H}_{i_n}$.

At 146, the amplitude of the trigonometric waveforms output at 138 is estimated. There are several ways that the amplitude trigonometric waveforms may be computed. First, according to a zero-forcing like technique, a waveform matrix is generated as:

$$A = \begin{bmatrix} e^{-j2\pi(\tau_{L_1}-1)([i_1\ i_2\ \ldots\ i_J]-1)/N} \\ e^{-j2\pi(\tau_{L_2}-1)([i_1\ i_2\ \ldots\ i_J]-1)/N} \\ \vdots \\ e^{-j2\pi(\tau_{L_Q}-1)([i_1\ i_2\ \ldots\ i_J]-1)/N} \end{bmatrix}.$$

Then, an amplitude matrix of the waveforms is computed as:

$$\prod = \hat{H}(A)^{-1} = [\hat{H}_{i_1}\ \hat{H}_{i_2}\ \ldots\ \hat{H}_{i_J}](A)^{-1}$$

$$= [\prod(1)\ \prod(2)\ \ldots\ \prod(u)\ \ldots\ \prod(Q)].$$

Second, according to minimum mean squared error (MMSE) like technique, the waveform matrix A is generated as in the first technique. Then, the amplitude matrix is computed as $$\prod = \hat{H}A^H(AA^H + \sigma E)^{-1} = [\hat{H}_{i_1}\ \hat{H}_{i_2}\ \ldots\ \hat{H}_{i_J}]A^H(AA^H + \sigma E)^{-1} \text{ or}$$

$$\prod = \hat{H}(A^H A + \sigma E)^{-1} A^H = [\hat{H}_{i_1}\ \hat{H}_{i_2}\ \ldots\ \hat{H}_{i_J}](A^H A + \sigma E)^{-1} A^H.$$

Figure 7:
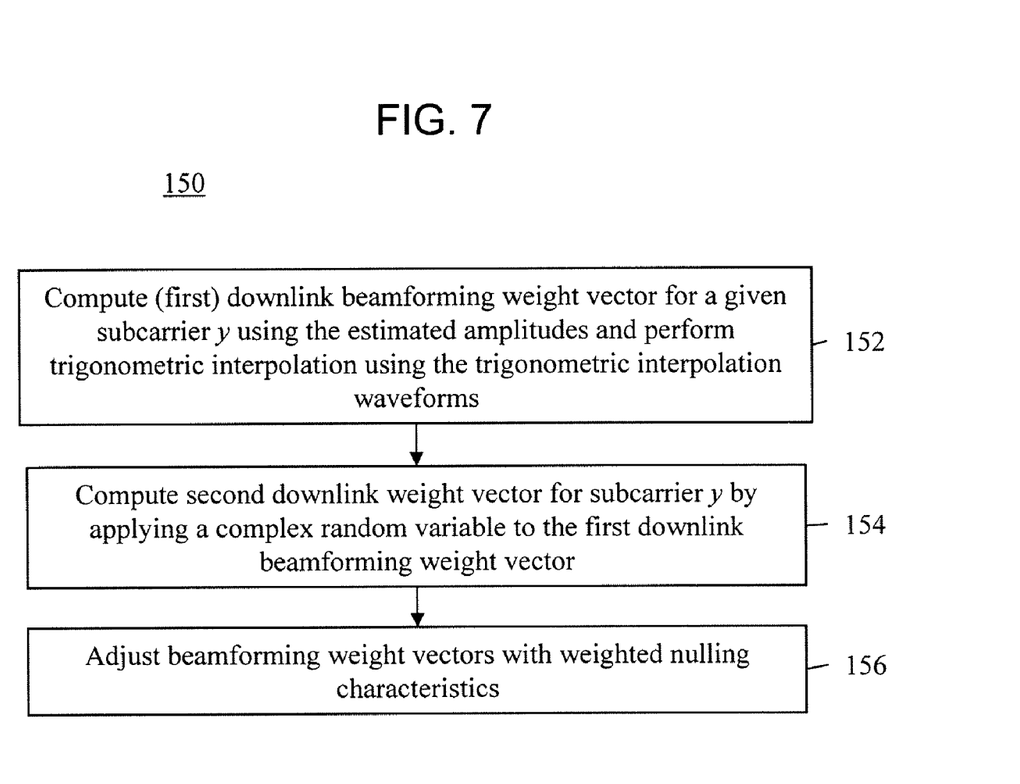
FIG. 7 is a flow chart of beamforming weight computation functions of the adaptive trigonometric interpolation process.

Turning now to FIG. 7, the function 150 for computing a beamforming weight vector (or multiple beamforming weight vectors) is now described. The purpose of this function is to compute one or more downlink beamforming weight vectors for any given subcarrier, denoted subcarrier y. The function 150 would be performed at each of a plurality of subcarriers of interest (allocated for a downlink transmission).

Generally, at 152, by applying the estimated amplitudes (computed at 146) and performing interpolation using the one or more trigonometric waveforms determined at 144, a (first) downlink beamforming weight vector for any given subcarrier is computed as $$W_y = \sum_{u=1}^{Q} \prod(u) e^{-j2\pi(\tau_{L_u}-1+\tau_{smooth})(y-1)/N}.$$

The beamforming weight vector may then be normalized by the computation $W_y = W_y / \operatorname{normal}(W_y) /$ A single beamforming weight vector suffices if a single signal is to be beamformed across the M antennas of the first device to the second device. Thus, if only a single beamforming weight vector is to be computed, function 152 is performed and function 154 need not be performed. Function 156 is performed in order to impose nulling characteristics to one or more beamforming weight vectors.

If more than one beamforming weight vector is to be computed, i.e., for MIMO beamforming two or more signal streams simultaneously from the first device to the second device, then a second downlink beamforming weight vector is computed at 154. For example, a second beamforming weight vector at a given subcarrier y is computed by applying a complex random variable to the (first) beamforming weight vector computed at 152. That is, $$W_{y2} = \sum_{u=1}^{Q} \gamma(u) \prod(u) e^{-j2\pi(\tau_{L_u}-1+\tau_{smooth})(y-1)/N},$$

where γ(u) is a complex random variable with a magnitude uniformly distributed in [0.5 1.5] and the phases uniformly distributed in [0 360] degrees. Alternatively, additional beamforming weight vectors can be generated by combining several independent beamforming weights across a frequency band spanning the subcarrier space of interest. In either case, function 154 indicates that one or more additional downlink beamforming weight vectors (the number of which depends on the number of spatial streams to be MIMO transmitted) are computed from a first downlink beamforming weight vector computed at 152.

At 156, the one or more beamforming weight vectors are adjusted with weighted nulling characteristics. For example, a beamforming weight vector $W_y$ (a column vector) for cluster m is set as a first beamforming weight vector $W_{m,1}$. Set $\tilde{U} = W_{y,2}$, a column vector. The second beamforming weight vector $W_{m,2}$ is computed as $$W_{m,2} = \alpha \tilde{U} - \frac{\beta W_{m,1}^H \tilde{U}}{(\text{norm}(W_{m,1}))^2} W_{m,1}$$

where $\alpha$ and $\beta$ are practical weighted scalars, e.g., $\alpha=1.2$ and $\beta=1$ or $\alpha=1$ and $\beta=0.8$. Then, the second beamforming weight vector is normalized, $W_{m,2} = W_{m,2}/\text{norm}(W_{m,2})$. Thus, the two beamforming weight vectors $W_{m,1}$ and $W_{m,2}$ are used for MIMO beamforming transmissions of two signal streams, such as according to the MIMO-A or MIMO-B transmission requirements of the IEEE 802.16e standard.

Although the subject matter illustrated and described herein as embodied in one or more specific examples, it is nevertheless not intended to be limited to the details shown, since various modifications and structural changes may be made therein without departing from the scope and range of equivalents of the claims.

What is claimed is:

1. A method comprising:
   receiving at M plurality of antennas of a first wireless communication device uplink transmission from a second wireless communication device, the uplink transmissions comprising groups of subcarriers;
   computing channel information from the received uplink transmissions;
   determining one or more trigonometric waveforms determined to approximate the channel information for each group of subcarriers using an iterative process comprising:
   setting an initial signal equal to an estimated channel information vector representing the channel information for a group of subcarriers;
   computing a power quantity for a range of time delay values based on the initial signal;
   determining a time delay value that yields a maximum of the power quantity;
   comparing the maximum with a threshold;
   when the maximum is greater than the threshold, computing a maximum trigonometric waveform using the time delay value that yields the maximum of the power quantity;
   computing an updated signal by subtracting a portion associated with the maximum trigonometric waveform;
   repeating computing the power quantity, determining the time delay value, comparing, computing the maximum trigonometric waveform and computing the updated signal for a maximum number of iterations corresponding to a maximum number of trigonometric waveforms or until the maximum of the power quantity is less than the threshold, to thereby produce a sequence of indices from the range of time delay values for one or more trigonometric waveforms; and
   computing a downlink beamforming weight vector at a given subcarrier by interpolation using the one or more trigonometric waveforms, wherein the downlink beamforming weight vector is for application to a signal to be transmitted via the M plurality of antennas of the first device to the second device.

2. The method of claim 1, wherein determining comprises determining one or more waveforms of the form cosine+jsine that approximate the channel information.

3. The method of claim 1, wherein computing channel information comprises computing a channel covariance matrix for each group of subcarriers from the received uplink transmissions at the M plurality of antennas, computing a weighted average antenna vector for each group of subcarriers from the channel covariance matrices, and computing an estimated channel information vector for each group of subcarriers based on one more pilot subcarriers in the group of subcarriers and the weighted average antenna vector computed for that group of subcarriers.

4. The method of claim 3, wherein computing channel information further comprises adjusting the estimated channel information vector using a smoothing function in the frequency domain to produce a smoothed estimated channel information vector for each group of subcarriers.

5. The method of claim 4, wherein the range of time delay values are derived from the smoothed estimated channel information vector.

6. The method of claim 1, and further comprising estimating an amplitude matrix for the one or more trigonometric waveforms, wherein computing the downlink beamforming weight vector comprises computing a first downlink beamforming weight vector at the given subcarrier based further on the amplitude matrix.

7. The method of claim 6, wherein computing the downlink beamforming weight vector further comprises computing a second beamforming weight vector from the first beamforming weight vector, wherein the first and second downlink beamforming weight vectors are for multiple-input multiple-output (MIMO) transmission of first and second signals via the M plurality of antennas of the first device to the second device.

8. The method of claim 7, and further comprising adjusting the first and second beamforming weight vectors with weighted nulling characteristics.

9. An apparatus comprising:
   a plurality of antennas;
   a receiver that is configured to generate receive signals from uplink transmissions sent by another apparatus and received at the plurality of antennas, the uplink transmissions comprising groups of subcarriers;
   a controller that is configured to:
   compute channel information from the received uplink transmissions;
   determine one or more trigonometric waveforms that approximate the channel information for each group of subcarriers using an iterative process by:
   setting an initial signal equal to an estimated channel information vector representing the channel information for a group of subcarriers;
   computing a power quantity for a range of time delay values based on the initial signal;
   determining a time delay value that yields a maximum of the power quantity;
   comparing the maximum with a threshold;

when the maximum is greater than the threshold, computing a maximum trigonometric waveform using the time delay value that yields the maximum of the power quantity;

computing an updated signal by subtracting a portion associated with the maximum trigonometric waveform;

repeating computing the power quantity, determining the time delay value, comparing, computing the maximum trigonometric waveform and computing the updated signal for a maximum number of iterations corresponding to a maximum number of trigonometric waveforms or until the maximum of the power quantity is less than the threshold, to thereby produce a sequence of indices from the range of time delay values for one or more trigonometric waveforms; and compute a downlink beamforming weight vector at a given subcarrier by interpolation using the one or more trigonometric waveforms.

10. The apparatus of claim 9, wherein the a sequence of indices are $[\tau_{L_1} \tau_{L_2} \ldots \tau_{L_q} \ldots \tau_{L_Q}]$ for trigonometric waveforms of the form $e^{-j2\pi(\tau_L-1)(i_n-1)/N}$, for $1 \leq m \leq M$ and $1 \leq n \leq J$, $1 \leq m \leq M$, where m is an antenna index, n is a subcarrier group index, N is a maximum number of subcarriers, J is the number of groups of subcarriers and M is the number of antennas.

11. The apparatus of claim 10, wherein the controller computes the power quantity as power $$P_f = \sum_{m=1}^{M} \left| \sum_{n=1}^{J} S_{i_n}(m) e^{j2\pi(T_f-1)(i_n-1)/N} \right|,$$

from the initial signal $S^i_n$ where $T_f[\tau_1 \ldots \tau_u \ldots \tau_U]$ is the range of time delay values, N is a frequency transform size, m is an antenna index, n is a subcarrier group index and $i_n$ is an index of a subcarrier in a nth group of subcarriers; and determines the time delay value $\tau_u$ that yields a maximum power of $P_f$ denoted $$\tau_L = \underset{\tau_u}{\mathrm{argmax}}(P_f),$$

computes the maximum trigonometric waveform $$h(m) = \frac{1}{J} \sum_{n=1}^{J} S_{i_n}(m) e^{j2\pi(\tau_L-1)(i_n-1)/N}$$

corresponding to $$\tau_L = \underset{\tau_u}{\mathrm{argmax}}(P_f),$$

and computes the updated signal $S_{i_n}(m) = S_{i_n}(m) - h(m) e^{-j2\pi(\tau_L-1)(i-1)/N}$ for $1 \leq m \leq M$ and $1 \leq n \leq J$.

12. The method of claim 11, wherein the controller is configured to compute the channel information by computing a channel covariance matrix $$R_{i_n} = \frac{1}{K} \sum_j \sum_q \begin{bmatrix} S_{j,q}(1) \\ S_{j,q}(2) \\ \vdots \\ S_{j,q}(M) \end{bmatrix} \begin{bmatrix} S_{j,q}(1) \\ S_{j,q}(2) \\ \vdots \\ S_{j,q}(M) \end{bmatrix}^H$$

for each group of subcarriers from the received uplink transmissions at the plurality of antennas, where $S_{j,q}(m)$ for $1 \leq m \leq M$ denotes the received frequency domain signals on the jth subcarrier, the qth symbol, and mth antenna, $^H$ denotes the Hermitian operation and K denotes the number of subcarriers in each group; computing a weighted average antenna vector $W_{i_n}$ for each group of subcarriers from the channel covariance matrices; computing an estimated channel information vector $\hat{H}_{i_n}$ for each group from of subcarriers based on estimated channel information derived from one more pilot subcarriers in the group of subcarriers and the weighted average antenna vector $W_{i_n}$ computed for that group of subcarriers, and adjusting the estimated channel information vector using a smoothing function in the frequency domain to produce a smoothed estimated channel information vector $\hat{H}_{i_n} = \hat{H}_{i_n} e^{j2\pi(\tau_{smooth}-1)(i_n-1)/N}$ for each group of subcarriers, where $$\tau_{smooth} = \underset{\tau_u}{\mathrm{argmax}}(P_s) \text{ and } P_s = \sum_{m=1}^{M} \left| \sum_{n=1}^{J} \hat{H}_{i_n}(m) e^{j2\pi(T_S-1)(i_n-1)/N} \right|,$$

where
where $T_S = [\tau_1 \ldots \tau_u \ldots \tau_U] = c1:c2$, where c1:c2 denote a range of time delay values of a sampling interval and N is a frequency transform size.

13. The method of claim 12, and wherein the controller is further configured to generate a waveform matrix $$A = \begin{bmatrix} e^{-j2\pi(\tau_{L_1}-1)([i_1\ i_2\ \ldots\ i_J]-1)/N} \\ e^{-j2\pi(\tau_{L_2}-1)([i_1\ i_2\ \ldots\ i_J]-1)/N} \\ \vdots \\ e^{-j2\pi(\tau_{L_Q}-1)([i_1\ i_2\ \ldots\ i_J]-1)/N} \end{bmatrix}$$

from the one or more trigonometric waveforms and to compute an amplitude matrix $\Pi$ from the waveform matrix A.

14. The apparatus of claim 12, wherein the controller is configured to compute a downlink beamforming weight vector at a given subcarrier y by computing $$W_y = \sum_{u=1}^{Q} \prod(u) e^{-j2\pi(\tau_{L_u}-1+\tau_{smooth})(y-1)/N},$$

where $\tau_{L_u}$ and $\tau_{smooth}$ are smoothing parameters.

15. A non-transitory processor readable tangible memory medium encoded with instructions that, when executed by a processor, cause the processor to:

compute channel information from uplink transmissions received at a plurality of antennas of a first wireless communication device from a second wireless communication device, the uplink transmission comprising groups of subcarriers;

determine one or more trigonometric waveforms that approximate the channel information for each group of subcarriers using an iterative process by:
  setting an initial signal equal to an estimated channel information vector representing the channel information for a group of subcarriers;
  computing a power quantity for a range of time delay values based on the initial signal;
  determining a time delay value that yields a maximum of the power quantity;
  comparing the maximum with a threshold;
  when the maximum is greater than the threshold, computing a maximum trigonometric waveform using the time delay value that yields the maximum of the power quantity;
  computing an updated signal by subtracting a portion associated with the maximum trigonometric waveform;
  repeating computing the power quantity, determining the time delay value, comparing, computing the maximum trigonometric waveform and computing the updated signal for a maximum number of iterations corresponding to a maximum number of trigonometric waveforms or until the maximum of the power quantity is less than the threshold, to thereby produce a sequence of indices from the range of time delay values for one or more trigonometric waveforms; and
compute a downlink beamforming weight vector at a given subcarrier by interpolation using the one or more trigonometric waveforms.

16. The processor readable tangible memory medium of claim 15, wherein the instructions that cause the processor to determine the one or more waveforms comprise instructions to compute one or more waveforms of the form cosine+jsine that approximate the channel information.

17. The processor readable tangible memory medium of claim 16, wherein the sequence of indices are $[\tau_{L_1} \tau_{L_2} \ldots \tau_{L_n} \ldots \tau_{L_q}]$ for trigonometric waveforms of the form $e^{-j2\pi(\tau_L-1)(i_n-1)/N}$, for $1 \leq m \leq M$ and $1 \leq n \leq J$, where m is an antenna index, n is a subcarrier group index, N is a maximum number of subcarriers, and J is the number of groups of subcarriers.

18. The processor readable tangible memory medium of claim 17, and further comprising instructions that, when executed by the processor, cause the processor to estimate an amplitude matrix for the one or more trigonometric waveforms, and wherein the instructions that cause the processor to compute the downlink beamforming weight vector comprise instructions that cause the processor to compute a first downlink beamforming weight vector based on the amplitude matrix.

19. The processor readable tangible memory medium of claim 18, and further comprising instructions to compute one or more additional downlink beamforming weight vectors from the first downlink beamforming weight vectors.

20. The processor readable tangible memory medium of claim 18, and further comprising adjusting the first beamforming weight vector with weighed nulling characteristics.

* * * * *